US010198620B2

(12) United States Patent
Guo et al.

(10) Patent No.: US 10,198,620 B2
(45) Date of Patent: Feb. 5, 2019

(54) AUGMENTED REALITY BASED COMPONENT REPLACEMENT AND MAINTENANCE

(71) Applicant: Accenture Global Services Limited, Dublin (IE)

(72) Inventors: Ping Guo, San Jose, CA (US); Daniel Kaplan, Redwood City, CA (US); Sunny M. Webb, San Francisco, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 412 days.

(21) Appl. No.: 14/792,081

(22) Filed: Jul. 6, 2015

(65) Prior Publication Data

US 2017/0011254 A1    Jan. 12, 2017

(51) Int. Cl.
*G06K 9/00*     (2006.01)
*G06F 17/30*    (2006.01)
(Continued)

(52) U.S. Cl.
CPC ..... *G06K 9/00208* (2013.01); *G06F 17/3028* (2013.01); *G06F 17/30244* (2013.01); *G06F 17/30247* (2013.01); *G06F 17/30256* (2013.01); *G06K 9/00671* (2013.01); *G06Q 10/08* (2013.01); *G06Q 10/20* (2013.01);
(Continued)

(58) Field of Classification Search
CPC .......... G06K 9/00208; G06F 17/30011; G06F 17/30244; G06F 17/30247; G06F 17/30256; G06F 17/30274; G06F 17/30277; G06F 17/3028; G06Q 10/08; G06Q 10/087; G06Q 10/0875; G06Q 10/20; G06Q 20/203; G06Q 30/0223; G06Q 30/0623; G06Q 30/0633; G06Q 30/0639; G06T 11/00
See application file for complete search history.

(56) References Cited

U.S. PATENT DOCUMENTS

| | | | |
|---|---|---|---|
| 7,941,431 B2 * | 5/2011 | Bluhm | G06F 17/30011 707/736 |
| 8,467,133 B2 * | 6/2013 | Miller | G02B 27/017 353/28 |

(Continued)

FOREIGN PATENT DOCUMENTS

CA        2895778        6/2014

*Primary Examiner* — Manav Seth
(74) *Attorney, Agent, or Firm* — Mannava & Kang, P.C.

(57) ABSTRACT

Augmented reality (AR) based component replacement and maintenance may include receiving a first wireless signal from a pair of AR glasses worn by a user. An image of a component viewed by the user may be analyzed and compared to a plurality of images of components stored in a database that includes information associated with the plurality of images of the components. Based on a match of the image of the component viewed by the user to one of the plurality of images of the components stored in the database, the component viewed by the user may be identified. An inventory of the identified component may be analyzed to determine whether a supplier includes the identified component in stock, and in response to a determination that the supplier includes the identified component in stock, an estimated time of delivery of the identified component to the user may be determined.

20 Claims, 7 Drawing Sheets

(51) Int. Cl.
  *G06Q 30/06* (2012.01)
  *G06Q 10/00* (2012.01)
  *G06Q 10/08* (2012.01)
  *G06Q 30/02* (2012.01)
  *G06T 11/00* (2006.01)
  *G06T 11/60* (2006.01)

(52) U.S. Cl.
  CPC ..... *G06Q 30/0223* (2013.01); *G06Q 30/0623* (2013.01); *G06Q 30/0633* (2013.01); *G06Q 30/0639* (2013.01); *G06T 11/00* (2013.01); *G06T 11/60* (2013.01); *G06K 2209/19* (2013.01)

(56) References Cited

U.S. PATENT DOCUMENTS

| | | | | |
|---|---|---|---|---|
| 8,534,543 B1* | 9/2013 | Eker | ............... | G06K 19/10 |
| | | | | 235/375 |
| 8,620,021 B2* | 12/2013 | Knudson | ............... | G06Q 30/00 |
| | | | | 382/100 |
| 8,917,902 B2* | 12/2014 | Hicks | ............... | G06Q 10/0875 |
| | | | | 382/100 |
| 9,595,098 B2* | 3/2017 | Hicks | ............... | G06Q 10/0875 |
| 2002/0107753 A1 | 8/2002 | Laughlin et al. | | |
| 2010/0151901 A1* | 6/2010 | Roden | ............... | G06Q 30/02 |
| | | | | 455/556.1 |
| 2012/0183137 A1 | 7/2012 | Laughlin | | |
| 2012/0204307 A1 | 8/2012 | De Mattei et al. | | |
| 2012/0249588 A1* | 10/2012 | Tison | ............... | G06F 1/1696 |
| | | | | 345/633 |
| 2013/0051611 A1* | 2/2013 | Hicks | ............... | G06Q 10/0875 |
| | | | | 382/103 |
| 2013/0218721 A1* | 8/2013 | Borhan | ............... | G06Q 20/322 |
| | | | | 705/26.41 |
| 2013/0346168 A1* | 12/2013 | Zhou | ............... | G06F 1/163 |
| | | | | 705/14.4 |
| 2014/0052563 A1* | 2/2014 | Watkins | ............... | G06Q 30/0621 |
| | | | | 705/26.5 |
| 2014/0078175 A1* | 3/2014 | Forutanpour | ............... | G02B 27/017 |
| | | | | 345/633 |
| 2014/0100994 A1 | 4/2014 | Tatzel et al. | | |
| 2014/0214684 A1* | 7/2014 | Pell | ............... | G06Q 30/02 |
| | | | | 705/57 |
| 2014/0354529 A1 | 12/2014 | Laughlin et al. | | |
| 2015/0039462 A1* | 2/2015 | Shastry | ............... | G06Q 30/0633 |
| | | | | 705/26.7 |
| 2015/0064299 A1 | 3/2015 | Koreis | | |
| 2016/0210732 A1* | 7/2016 | Hicks | ............... | G06Q 10/0875 |
| 2016/0379176 A1* | 12/2016 | Brailovskiy | ............... | G06K 9/00664 |
| | | | | 705/26.7 |

\* cited by examiner

AUGMENTED REALITY BASED COMPONENT REPLACEMENT AND MAINTENANCE

BACKGROUND

Augmented reality (AR) may include a live, direct or indirect, view of a physical, real-world environment whose elements are augmented (e.g., supplemented) by computer-generated sensory input. The computer-generated sensory input may include sound, video, graphics, or global positioning system (GPS) data. AR may enhance a user's perception of reality.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Unlike virtual reality (VR) which replaces the real world with a simulated one, augmented reality (AR) typically includes the real-time overlay of virtual data, images, and videos onto live video feeds. For AR, the base layer is typically real and may include, for example, a live video feed, or in the case of head-mounted displays, a user's own vision.

In fields, such as, building maintenance, remote machinery maintenance, other types of structural maintenance, and generally, any field where a component is to be replaced or maintained (e.g., fixed, or otherwise subjected to periodic maintenance), a worker may inspect the component to determine whether the component needs to be replaced or maintained. Examples of a component may include a part that forms a building, machinery, structure, etc., or the building, machinery, structure, etc. itself. Examples of a worker may include a technician, an engineer, and, generally, any type of user that is associated with a task related to replacement or maintenance of a component.

In this regard, according to an example of a structure, a power plant may include virtually hundreds of thousands of components that need periodic replacement or maintenance. During inspection, a worker may identify a component that needs to be replaced or maintained. The maintenance may include replacing a sub-component of the component (e.g., a capacitor of a power supply unit), and/or using specific operations and/or a part to perform the maintenance on the component. However, based on the existence of several such components (e.g., hundreds of thousands in many cases), it may be challenging to efficiently and timely identify the component, the sub-component, and/or the related part to perform the maintenance on the component. Moreover, once the component, the sub-component, and/or the related part to perform the maintenance on the component is identified, it may be further challenging to efficiently and timely determine and/or obtain a replacement component, sub-component, and/or the related part, and/or a location of such a replacement for the component, the sub-component, and/or the related part to perform the maintenance on the component.

In order to address the aforementioned aspects related to replacement and/or maintenance of a component, according to examples disclosed herein, an AR based component replacement and maintenance system and a method for AR based component replacement and maintenance are disclosed herein. The system and method disclosed herein may generally provide for AR based component replacement and maintenance in a variety of fields. For example, the system and the method disclosed herein may provide for a user, such as, for example, a field engineer, and, generally, any type of user to replace and/or otherwise maintain a component. For example, the user may utilize an AR device, such as, for example, a set of AR glasses (or phone, watch, other types of wearable devices, etc.) to obtain (e.g., receive, or otherwise take) an image of a component, and send the component image to a component identifier that is executed by a hardware processor. The component identifier may receive the component image, analyze the component image to match the component image to an existing component image from a set of existing component images. Based on the matched component image, the component identifier may use the matched component image to identify the component, and to determine component details (e.g., component identification (ID), component name, component description, etc.). Further, a component inventory analyzer that is executed by a hardware processor may analyze the identified component to determine component inventory information (e.g., which warehouse has the component in stock (ordered by distance to the location of the user), how many of components are in stock, if the component is not stock, then a supplier of the component, where the component can be printed, etc.). The component details and the component inventory information may be forwarded to the AR device, where the AR device may display the component details and the component inventory information to the user. The user may use the AR device to perform various functions, such as, for example, ordering the identified component, for example, from a warehouse, from a third party component supplier, to be printed (e.g., by a three-dimensional printer), etc. The system and method disclosed herein, may thus implement efficiency with respect to identification of a component, location and/or ordering of the component, and retrieval and installation of the component.

As described herein, the system and method disclosed herein may be implemented in a variety of fields. For example, the system and method disclosed herein may be implemented in the field of oil and gas, and other such fields, where field workers and other personnel are required to wear safety glasses when in any high risk location. Such safety glasses may be implemented as AR glasses as disclosed herein. According to another example, the AR based component replacement and maintenance may be performed in the building, transportation, power, and virtually any field where components may be needed at remote locations, and in an efficient and timely manner.

The system and method disclosed herein may provide, for example, audio and video capabilities with component inventory management personnel, audio search of knowledge repositories, and remote collaboration with inventory management personnel. The system and method disclosed herein may also provide maintenance history and checklist analysis, and step-by-step repair guidance with respect to the components that are to be replaced and/or maintained. The system and method disclosed herein may also provide training videos overlaid on actual equipment and environment, and customizable training with respect to replacement and/or maintenance of a component.

The AR based component replacement and maintenance system and the method for AR based component replacement and maintenance disclosed herein provide a technical solution to technical problems related, for example, to component replacement and maintenance. In many instances, efficiency of component replacement and maintenance can be limited, for example, due to the lack of information available to individuals at job sites. The system and method disclosed herein provide the technical solution of a component identifier that is executed by at least one hardware processor to receive a first wireless signal from a pair of AR glasses worn by a user. The AR glasses may include a display viewable by the user and a camera to image a component viewed by the user. The component identifier may analyze the image of the component viewed by the user, and compare the image of the component viewed by the user to a plurality of images of components stored in a database. The database may include information associated with the plurality of images of the components. Based on a match of the image of the component viewed by the user to one of the plurality of images of the components stored in the database, the component identifier may identify the component viewed by the user to determine a component detail. A component inventory analyzer that is executed by the at least one hardware processor may analyze an inventory of the identified component to determine whether a supplier includes the identified component in stock, and in response to a determination that the supplier includes the identified component in stock, an estimated time of delivery of the identified component to the user. Further, an AR integrator and controller that is executed by the at least one hardware processor may generate a display including the component detail, and order details related to the supplier of the identified component, and receive, based on selection of an option in the display, an indication from the user to order the identified component from the supplier.

Figure 1:
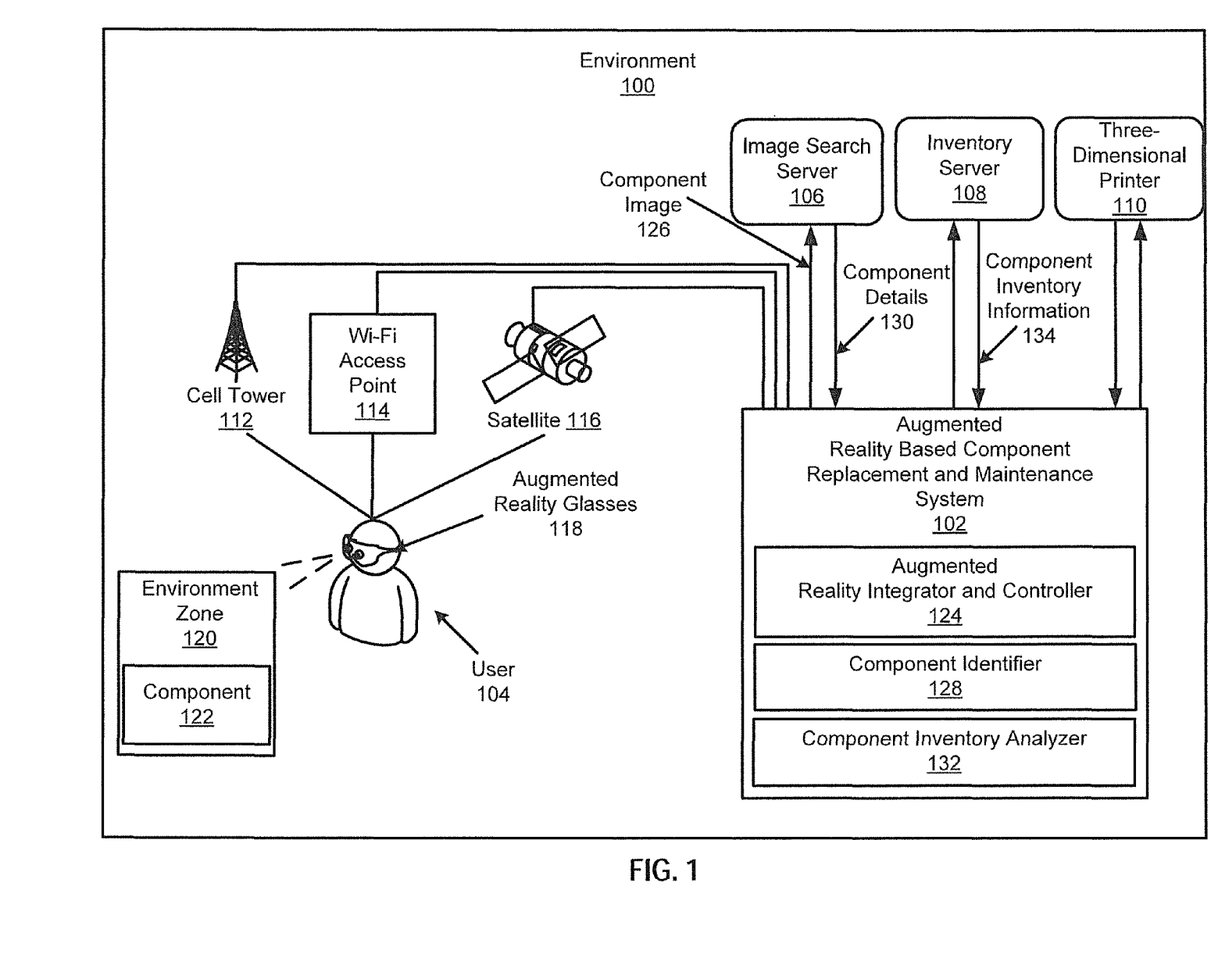
FIG. 1 illustrates an environment including an augmented reality (AR) based component replacement and maintenance system, according to an example of the present disclosure.

FIG. 1 illustrates an environment 100 including an AR based component replacement and maintenance system 102, according to an example of the present disclosure. The environment 100 may include a user 104, such as, for example, a field engineer, etc., to communicate with the system 102. The system 102 may communicate with an image search server 106, an inventory server 108, and a three-dimensional printer 110. The image search server 106, the inventory server 108, and the three-dimensional printer 110 may be disposed and operate separately from the system 102 as shown in FIG. 1, or be a part of the system 102 where the image search server 106, the inventory server 108, and the three-dimensional printer 110 form operational units of the system 102. In the example of FIG. 1, the image search server 106, the inventory server 108, and the three-dimensional printer 110 are illustrated as being disposed and operating separately from the system 102 to illustrate the data flow between the system 102 and the image search server 106, the inventory server 108, and the three-dimensional printer 110.

A connection to the system 102 may be provided, for example, wirelessly via sources, such as, for example, cell towers 112, Wi-Fi access points 114, and/or satellite based communication 116. Alternatively or additionally, the connection to the system 102 may be implemented by downloading data to a portable device (e.g., a smart phone, tablet, or other portable computing device) in which operations such as the identification of a component and transmission of an image are performed by the portable device.

The user 104 may use an AR device, such as, for example, AR glasses 118 to ascertain and display real-time virtual data, images, and videos onto the user's own vision of an environment zone 120 including a component 122. The AR glasses 118 may be implemented as a set of glasses that are worn by the user 104, or alternatively, implemented as a mobile device having a display and a camera, such as smart phones or tablets with cameras.

The AR glasses 118 may function as a head mounted display unit that provides graphic overlays. The AR glasses 118 may be tracked by the system 102 that augments the natural view of the user 104, for example, with text, labels, arrows, and animated sequences designed to facilitate comprehension of information related to the component 122, location aspects related to the user 104 and the component 122, and execution of functionality related to the system 102. The AR glasses 118 may use wireless infrastructure, such as, for example, the cell towers 112, the Wi-Fi access points 114, and/or the satellite based communication 116, to connect to the system 102.

The system 102 may include an AR integrator and controller 124 that is executed by a hardware processor (e.g., the hardware processor 702 of FIG. 7) to provide integration of the AR glasses 118 with a variety of vendor based applications. For example, the AR integrator and controller 124 may provide integration of the AR glasses 118 with GOOGLE, MICROSOFT, APPLE, etc., based applications. The AR integrator and controller 124 may also control operation of the system 102 to provide, for example, communication capabilities for the user 104 with the system 102 based on the user's vision of the environment zone 120 including the component 122.

The AR integrator and controller 124 may control operation of the system 102 to provide video analytics and computer vision support for the user 104. The AR integrator and controller 124 may also control operation of the system 102 to provide audio search capabilities for the user 104.

The AR integrator and controller 124 may provide log-in authentication functionality with respect to the user 104. In this regard, the AR integrator and controller 124 may support independent and secure log-in for the user 104, where the user 104 would need to be authenticated and authorized before using the functionalities of the system 102. The log-in may be performed by the AR integrator and controller 124, for example, based on voice recognition, a retina eye scan, and/or other authentication techniques for identifying the user 104.

The user 104 may utilize the AR glasses 118 to obtain (e.g., receive, or otherwise take) an image 126 of the component 122, and send the component image 126 to a component identifier 128 that is executed by a hardware processor. The component identifier 128 may receive the component image 126, and operate in conjunction with (or include) the image search server 106 to match the component image 126 to an existing component image from a set of existing component images to obtain a matched component image. The component identifier 128 may also determine a confidence level related to the matching of the component image 126 to the existing component image. For example, the confidence level may be increased for a component image 126 that is taken from multiple angles. Based on the matched component image, the component identifier 128 may operate in conjunction with (or include) the image search server 106 to use the matched component image 126 to identify the component 122 (e.g., based on a text-based search, a SQL based search, etc.), and to determine component details 130 (e.g., component identification (ID), component name, component description, etc.).

A component inventory analyzer 132 that is executed by a hardware processor may operate in conjunction with (or include) the inventory server 108 to analyze the component details 130 of the identified component to determine component inventory information 134 (e.g., which warehouse has the component in stock (ordered by distance to the location of user), how many of components are in stock, if the component is not stock, then a supplier of the component, where the component can be printed, details related to the printing process for that component such as time to print, time for delivery from the printing location, etc.). The component details 130 and the component inventory information 134 may be forwarded to the AR glasses 118, where the AR glasses 118 may be used to display the component details 130 and the component inventory information 134 to the user 104.

The user may use the AR glasses 118 to perform various functions, such as, for example, ordering the identified component 122, for example, from a warehouse, from a third party component supplier, to be printed (e.g., by the three-dimensional printer 110), etc. In this regard, the AR integrator and controller 124 may provide the functionalities related to the ordering of the identified component 122, and various other functionalities related to which warehouse has the component in stock (ordered by distance to the location of user), how many of components are in stock, if the component is not stock, then a supplier of the component, where the component can be printed, etc.).

As described herein, the elements of the system 102 may be machine readable instructions stored on a non-transitory computer readable medium. In addition, or alternatively, the elements of the system 102 may be hardware or a combination of machine readable instructions and hardware.

Figure 2:
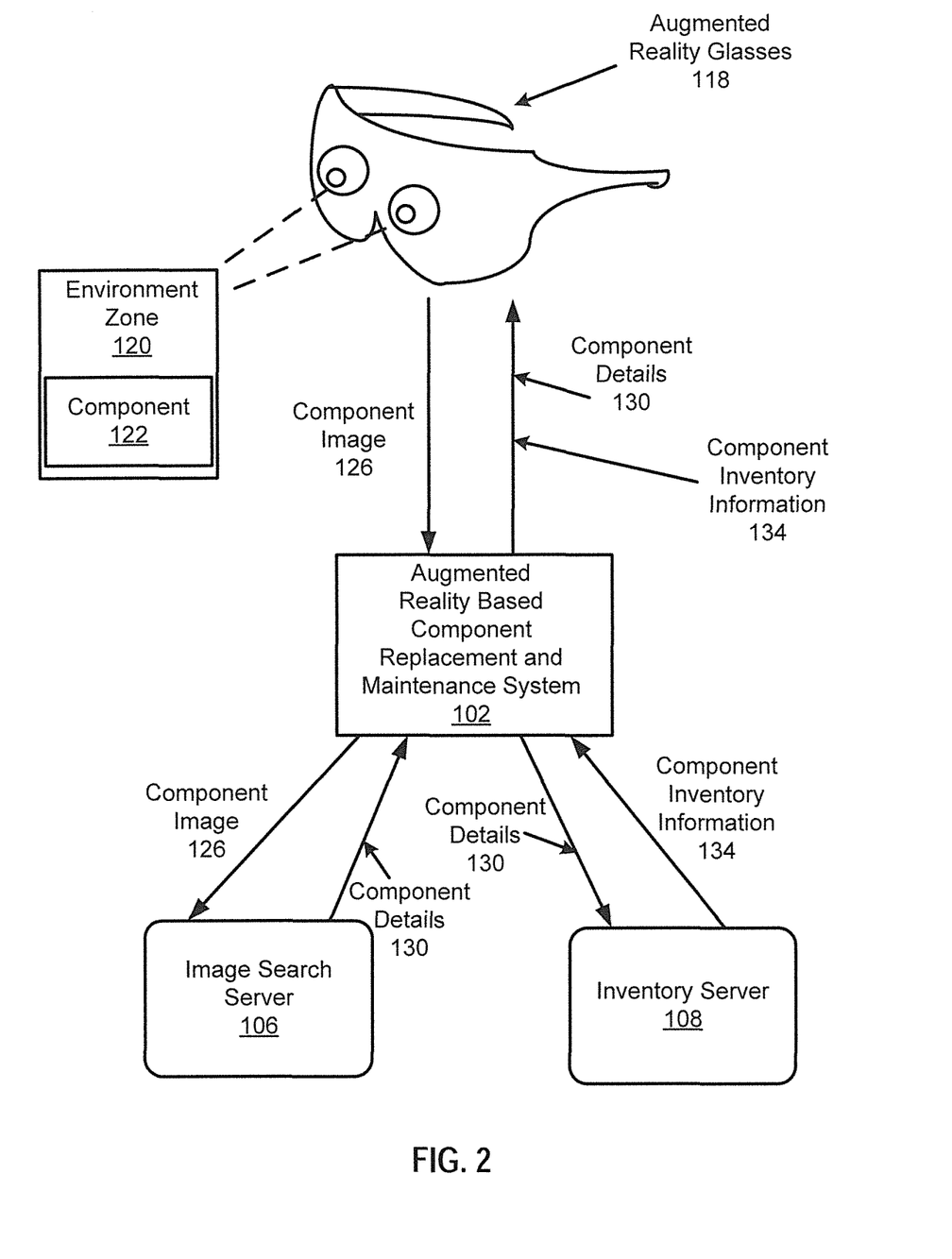
FIG. 2 illustrates a logic flow of the AR based component replacement and maintenance system of FIG. 1, according to an example of the present disclosure.

FIG. 2 illustrates a logic flow of the system 102, according to an example of the present disclosure.

Referring to FIG. 2, the user 104 may initiate an image recognition process by utilizing the AR glasses 118 to obtain an image of the component 122. The user 104 may send the component image 126 to the system 102, where the component identifier 128 of the system 102 may receive the component image 126, and operate in conjunction with the image search server 106 to match the component image 126 to an existing component image from a set of existing component images to obtain a matched component image. Based on the matched component image, the component identifier 128 may operate in conjunction with the image search server 106 to use the matched component image to identify the component 122, and to determine the component details 130 (e.g., component identification (ID), component name, component description, etc.). The system 102 may further operate in conjunction with the component inventory analyzer 132 to analyze the component details 130 of the identified component to determine the component inventory information 134 (e.g., which warehouse has the component in stock (ordered by distance to the location of user), how many of components are in stock, if the component is not stock, then a supplier of the component, where the component can be printed, etc.). The component details 130 and the component inventory information 134 may be forwarded to the AR glasses 118, where the AR glasses 118 may be used to display the component details 130 and the component inventory information 134 to the user 104.

The user may use the AR glasses 118 to perform various functions, such as, for example, ordering the identified component 122, for example, from a warehouse, from a third party component supplier, to be printed (e.g., by the three-dimensional printer 110), etc.

Figure 3:
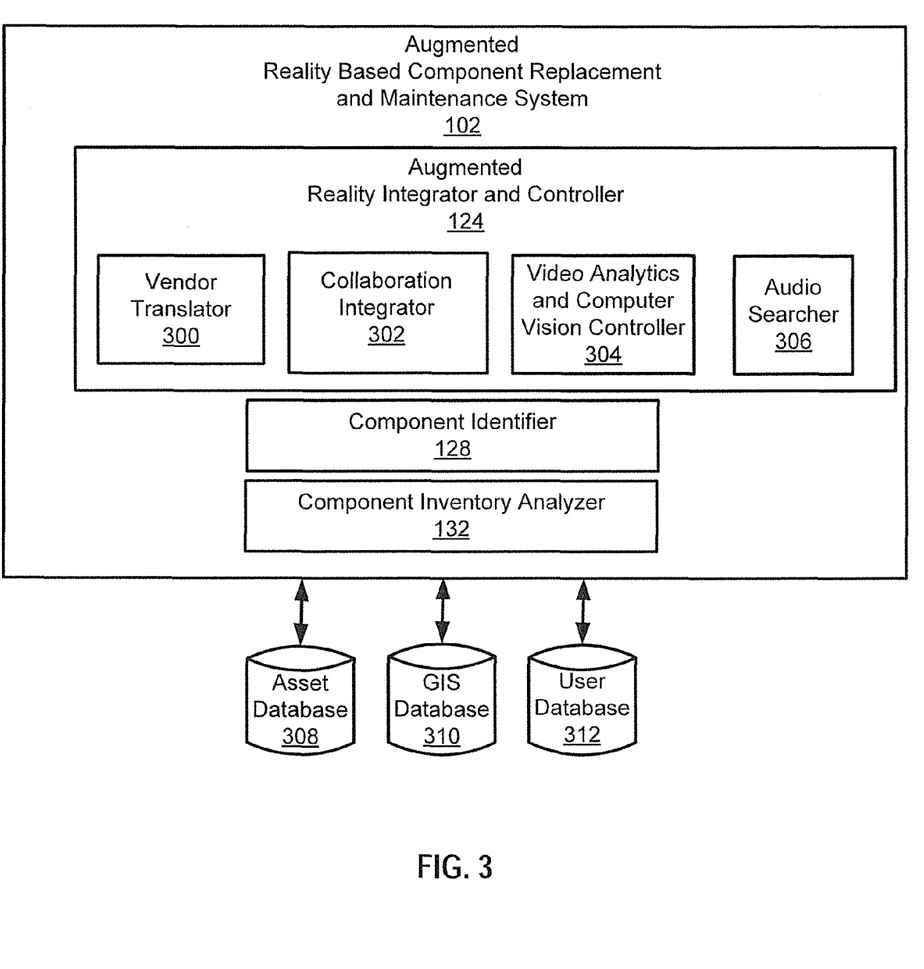
FIG. 3 illustrates further details of the architecture of the AR based component replacement and maintenance system of FIG. 1, according to an example of the present disclosure.

FIG. 3 illustrates further details of the architecture of the system 102, according to an example of the present disclosure.

Referring to FIG. 3, as described herein, the AR integrator and controller 124 may provide integration of the AR glasses 118 with a variety of vendor based applications. For example, the AR integrator and controller 124 may provide integration of the AR glasses 118 with GOOGLE, MICROSOFT, APPLE, etc., based applications, via a vendor translator 300. A different vendor translator 300 may be provided for each different vendor based application.

The AR integrator and controller 124 may further include a collaboration integrator 302 to control operation of the system 102 to provide, for example, collaboration for the user 104 with the system 102 based on the user's vision of the environment zone 120 including the component 122. The collaboration integrator 302 may generally provide for audio and video-based integration of the user 104 wearing the AR glasses 118 with the system 102. The audio and video-based integration may be implemented in conjunction with a video analytics and computer controller 304, and an audio searcher 306. The collaboration integrator 302 may provide for remote collaboration of the user 104 with the system 102, and/or with remote personnel associated with the system 102. These aspects related to the collaboration integrator 302 may generally provide for decreased usage of users 104 (e.g., field engineers) in dangerous and/or expensive locations, and/or improved accessibility by the users 104 with various environment zones. Based on the audio and video capabilities of the AR glasses 118, the collaboration integrator 302 may provide for a further user (e.g., a higher level supervisor, coordinator, etc.) associated with the system 102 to see and hear what the user 104 wearing the AR glasses 118 is seeing and hearing, and communicate with the user 104. The collaboration integrator 302 may also provide for a remote user 104 to connect with the system 102, and with other personnel associated with the system 102, who are in safer and/or lower cost locations to communicate with the user 104.

The video analytics and computer vision controller 304 may control operation of the system 102 to provide video analytics and computer vision support for the user 104. The audio searcher 306 may control operation of the system 102 to provide audio search capabilities for the user 104.

An asset database 308 may include information related to management of business operations and customer relations. A GIS database 310 may include information related to capture, storage, manipulation, analysis, management, and presentation of geographical data related to the user 104 and the AR glasses 118. A user database 312 may include information related, for example, to qualifications, history, current status, etc., of the user 104.

Figure 4:
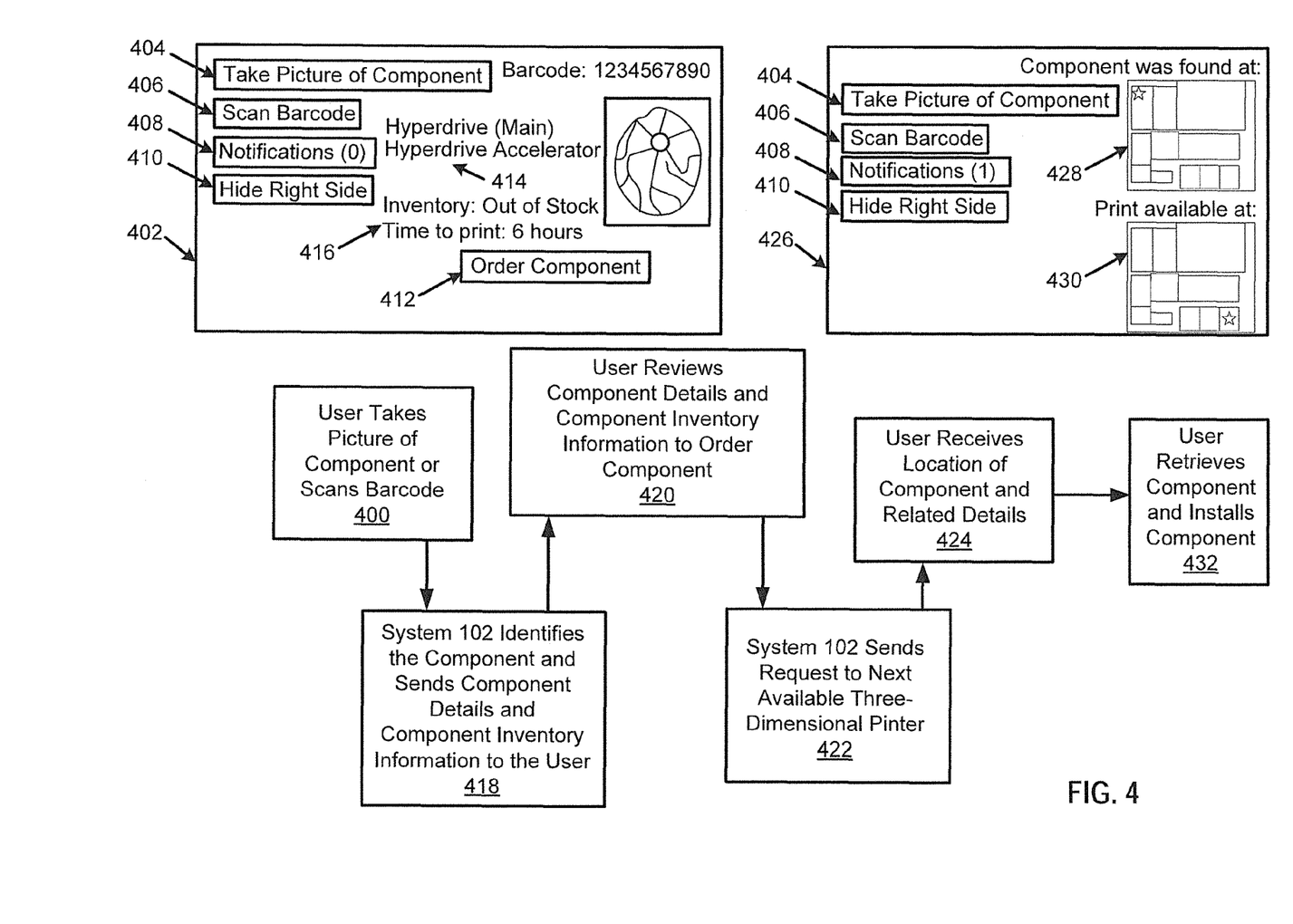
FIG. 4 illustrates a workflow related to the AR based component replacement and maintenance system of FIG. 1, according to an example of the present disclosure.

FIG. 4 illustrates a workflow related to the system 102, according to an example of the present disclosure.

Referring to FIGS. 1 and 4, at block 400, the user 104 may initiate an image recognition process by utilizing the AR glasses 118 to obtain an image of the component 122. In this regard, the user 104 may also use the AR glasses 118 to scan a barcode related to the component 122. The user 104 may operate the AR glasses 118 to send the component image 126 (and/or the barcode) to the system 102.

With respect to block 400, an example of a display of the AR glasses 118 is illustrated at 402. The display 402 of the AR glasses 118 may include options for the user 104 to take a picture (i.e., image) of a component at 404, scan a barcode of a component at 406, pending notifications related to the component at 408, an option to modify the display 402 at 410, an option to order the component at 412, component details at 414, and component inventory information at 416 (with an image of the component 122 being adjacently displayed). The various options of the display 402 may be selected by a touch, gaze, and/or head position of the user 104 relative to the AR glasses 118.

At block 418, the component identifier 128 of the system 102 may receive the component image 126, and operate in conjunction with the image search server 106 to match the component image 126 to an existing component image from a set of existing component images to obtain a matched component image. Based on the matched component image, the component identifier 128 may operate in conjunction with the image search server 106 to use the matched component image to identify the component 122, and to determine the component details 130. The component inventory analyzer 132 may further operate in conjunction with the inventory server 108 to analyze the component details 130 of the identified component to determine the component inventory information 134. The component details 130 and the component inventory information 134 may be forwarded to the AR glasses 118, where the AR glasses 118 may be used to display the component details 130 and the component inventory information 134 to the user 104.

At block 420, the user 104 may use the AR glasses 118 to perform various functions, such as, for example, ordering the identified component 122, for example, from a warehouse, from a third party component supplier, to be printed (e.g., by the three-dimensional printer 110), etc.

At block 422, assuming that the user requests the component 122 to be printed by the three-dimensional printer 110, the system 102 may forward the request to the next available three-dimensional printer 110.

At block 424, the user 104 may receive an identification of a location of the component 122, and related details (e.g., when the part may be picked up, etc.). For example, the display 426 of the AR glasses 118 may include a map of a location of the component at 428, for example, if the component exists in a warehouse. Further, the display 426 of the AR glasses 118 may include a map of a location where the component may be printed by the three-dimensional printer 110 at 430, for example, if the component does not exist in a warehouse (or with a supplier), or if the component is needed in an expedited manner from an available three-dimensional printer 110. For example, if the component is not available in a warehouse (or with a supplier), or if the user 104 is not able to obtain the component from a warehouse (or from a supplier) in a predetermined amount of time, the component may be printed at an available three-dimensional printer 110.

At block 432, the user 104 may retrieve the component 122 (e.g., from a designated delivery location, or from the warehouse, or from the three-dimensional printer 110), and install (e.g., replace or otherwise maintain) the component 122.

Figure 5:
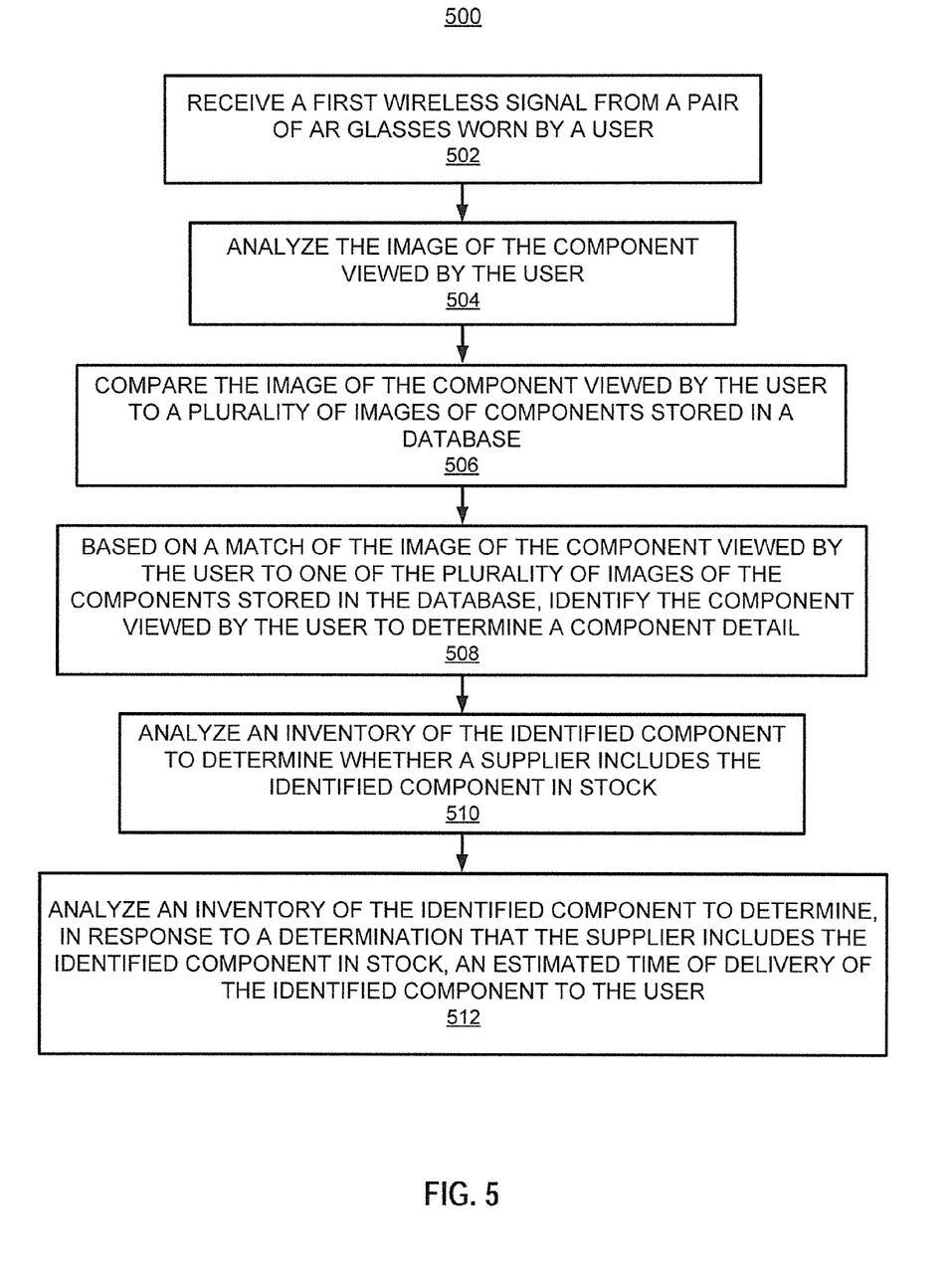
FIG. 5 illustrates a method for AR based component replacement and maintenance, according to an example of the present disclosure.
Figure 6:
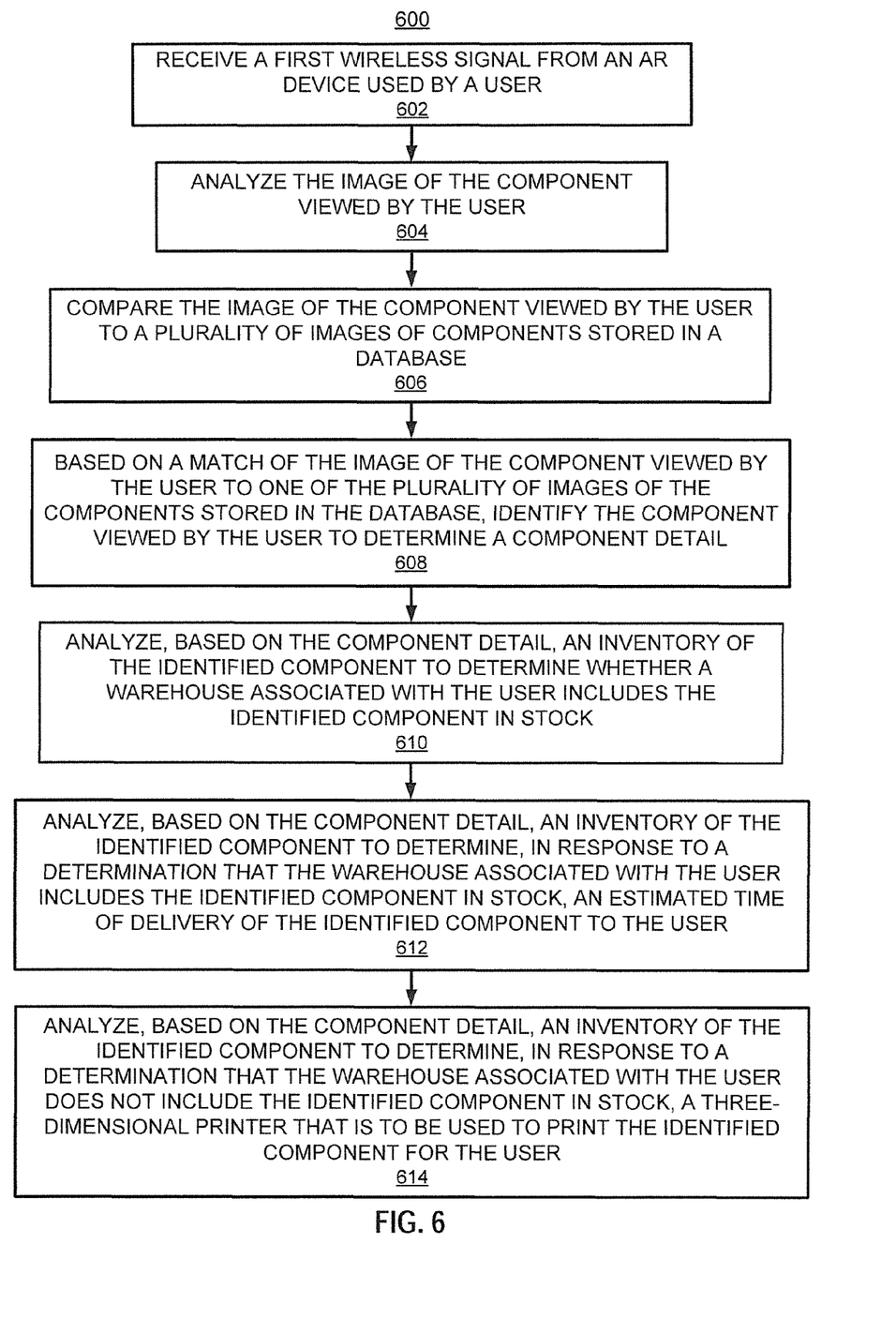
FIG. 6 illustrates further details of the method for AR based component replacement and maintenance, according to an example of the present disclosure.

FIGS. 5 and 6 respectively illustrate flowcharts of methods 500 and 600 for AR based component replacement and maintenance, according to examples. The methods 500 and 600 may be implemented on the system 102 described above with reference to FIGS. 1-4 by way of example and not limitation. The methods 500 and 600 may be practiced in other systems.

Referring to FIGS. 1-5, and particularly FIG. 5, at block 502, the method 500 may include receiving a first wireless signal from a pair of AR glasses 118 worn by a user 104. The AR glasses 118 may include a display viewable by the user 104 and a camera to image a component 122 viewed by the user 104.

At block 504, the method 500 may include analyzing the image of the component 122 viewed by the user 104.

At block 506, the method 500 may include comparing the image of the component 122 viewed by the user 104 to a plurality of images of components stored in a database. The database may include information associated with the plurality of images of the components.

At block 508, based on a match of the image of the component 122 viewed by the user 104 to one of the plurality of images of the components stored in the database, the method 500 may include identifying the component 122 viewed by the user 104 to determine a component detail 130.

At block 510, the method 500 may include analyzing an inventory of the identified component 122 to determine whether a supplier may include the identified component 122 in stock.

At block 512, the method 500 may include analyzing an inventory of the identified component 122 to determine, in response to a determination that the supplier may include the identified component 122 in stock, an estimated time of delivery of the identified component 122 to the user 104.

According to an example, for the method 500, the component detail 130 may include a component ID, a component name, and/or a component description.

According to an example, analyzing the inventory of the identified component 122 may further include determining whether a plurality of suppliers, including the supplier, include the identified component 122 in stock, and in response to a determination that the plurality of suppliers, including the supplier, include the identified component 122 in stock, sorting selected ones of the plurality of suppliers that include the identified component 122 in stock in order of distance from the user 104.

According to an example, analyzing the inventory of the identified component 122 may further include determining whether a plurality of suppliers, including the supplier, include the identified component 122 in stock, and in response to a determination that the plurality of suppliers, including the supplier, include the identified component 122 in stock, sorting selected ones of the plurality of suppliers that include the identified component 122 in stock in order of estimated times of delivery of the identified component 122 to the user 104.

According to an example, analyzing the inventory of the identified component 122 may further include determining whether a plurality of suppliers, including the supplier, include the identified component 122 in stock, and in response to a determination that none of the plurality of suppliers, including the supplier, include the identified component 122 in stock, determining a three-dimensional printer 110 that may be used to print the identified component 122 for the user 104.

According to an example, analyzing the inventory of the identified component 122 may further include determining whether a plurality of suppliers, including the supplier, include the identified component 122 in stock, and in response to a determination that the plurality of suppliers, including the supplier, include the identified component 122 in stock, sorting selected ones of the plurality of suppliers that include the identified component 122 in stock in order of estimated times of delivery of the identified component 122 to the user 104. Further, analyzing the inventory of the identified component 122 may further include comparing the estimated times of delivery for the selected ones of the plurality of suppliers that include the identified component 122 in stock to a minimum required time of delivery, and in response to a determination that all of the estimated times of delivery for the selected ones of the plurality of suppliers that include the identified component 122 in stock are greater than the minimum required time of delivery, determining a three-dimensional printer 110 that may be used to print the identified component 122 for the user 104.

According to an example, the method 500 may further include generating a display (e.g., see FIG. 4) including the component detail 130, and ordering details related to the supplier of the identified component 122, and receiving, based on selection of an option in the display, an indication from the user 104 to order the identified component 122 from the supplier.

According to an example, the method 500 may further include generating a display including order details related to the supplier of the identified component 122 by generating, as described herein with reference to FIG. 4, a map of a location of the supplier of the identified component 122, and/or a map of a location of a three-dimensional printer 110 that may be used to print the identified component 122.

According to an example, the method 500 may further include determining whether the user 104 is an authorized user to order the identified component 122 from the supplier, and in response to a determination that the user 104 is the authorized user to order the identified component 122 from the supplier, authenticating the user 104 to perform functionality related to ordering of the identified component 122 from the supplier.

According to an example, the method 500 may further include determining a confidence of the identification of the component 122 viewed by the user 104 based on a degree of a match (e.g., a percentage of features of the component 122) of the image of the component 122 viewed by the user 104 to the one of the plurality of images of the components stored in the database, and in response to a determination that the degree of the match of the image of the component 122 viewed by the user 104 to the one of the plurality of images of the components stored in the database exceeds a specified confidence threshold, designating the component 122 viewed by the user 104 as the identified component 122.

According to an example, in response to a determination that the supplier does not may include the identified component 122 in stock, the method 500 may further include determining a three-dimensional printer 110 that may be used to print the identified component 122 for the user 104.

According to an example, in response to a determination that the supplier does not may include the identified component 122 in stock, the method 500 may further include determining an estimated time of manufacture of the identified component 122 by the supplier, comparing the estimated time of manufacture and the estimated time of delivery for the identified component 122 to a minimum required time, and in response to a determination that the estimated time of manufacture and the estimated time of delivery for the identified component 122 is greater than the minimum required time, determining a three-dimensional printer 110 that may be used to print the identified component 122 for the user 104.

Referring to FIG. 6, at block 602, the method 600 may include receiving a first wireless signal from an AR device used by a user 104. The AR device may include a display viewable by the user 104 and a camera to image a component 122 viewed by the user 104.

At block 604, the method 600 may include analyzing the image of the component 122 viewed by the user 104.

At block 606, the method 600 may include comparing the image of the component 122 viewed by the user 104 to a plurality of images of components stored in a database. The database may include information associated with the plurality of images of the components.

At block 608, based on a match of the image of the component 122 viewed by the user 104 to one of the plurality of images of the components stored in the database, the method 600 may include identifying the component 122 viewed by the user 104 to determine a component detail 130.

At block 610, the method 600 may include analyzing, based on the component detail 130, an inventory of the identified component 122 to determine whether a warehouse associated with the user 104 includes the identified component 122 in stock.

At block 612, the method 600 may include analyzing, based on the component detail 130, an inventory of the identified component 122 to determine, in response to a determination that the warehouse associated with the user 104 includes the identified component 122 in stock, an estimated time of delivery of the identified component 122 to the user 104.

At block 614, the method 600 may include analyzing, based on the component detail 130, an inventory of the identified component 122 to determine, in response to a determination that the warehouse associated with the user 104 does not include the identified component 122 in stock, a three-dimensional printer 110 that may be used to print the identified component 122 for the user 104.

According to an example, for the method 600 analyzing, based on the component detail 130, the inventory of the identified component 122 to determine whether the warehouse associated with the user 104 includes the identified component 122 in stock, may further include determining whether a plurality of warehouses associated with the user 104, including the warehouse associated with the user 104, include the identified component 122 in stock, and in response to a determination that the plurality of warehouses associated with the user 104, including the warehouse associated with the user 104, include the identified component 122 in stock, sorting selected ones of the plurality of warehouses associated with the user 104 that include the identified component 122 in stock in order of distance from the user 104.

According to an example, for the method 600 analyzing, based on the component detail 130, the inventory of the identified component 122 to determine whether the warehouse associated with the user 104 includes the identified component 122 in stock, may further include determining whether a plurality of warehouses associated with the user 104, including the warehouse associated with the user 104, include the identified component 122 in stock, and in response to a determination that the plurality of warehouses associated with the user 104, including the warehouse associated with the user 104, include the identified component 122 in stock, sorting selected ones of the plurality of warehouses associated with the user 104 that include the identified component 122 in stock in order of estimated times of delivery of the identified component 122 to the user 104.

According to an example, a method for AR based component replacement and maintenance may include receiving a first wireless signal from an AR device used by a user 104. The AR device may include a display viewable by the user 104 and a camera to image a component 122 viewed by the user 104. The method for AR based component replacement and maintenance may further include analyzing the image of the component 122 viewed by the user 104, and comparing the image of the component 122 viewed by the user 104 to a plurality of images of components stored in a database. The database may include information associated with the plurality of images of the components. The method for AR based component replacement and maintenance may further include, based on a match of the image of the component 122 viewed by the user 104 to one of the plurality of images of the components stored in the database, identifying the component 122 viewed by the user 104 to determine a component detail 130. The method for AR based component replacement and maintenance may further include analyzing, based on the component detail 130, an inventory of the identified component 122 to determine whether a supplier associated with the user 104 manufactures the identified component 122. The method for AR based component replacement and maintenance may further include analyzing, based on the component detail 130, an inventory of the identified component 122 to determine, in response to a determination that the supplier associated with the user 104 does not manufacture the identified component 122, a three-dimensional printer 110 that may be used to print the identified component 122 for the user 104. Analyzing, based on the component detail 130, the inventory of the identified component 122 to determine whether the supplier associated with the user 104 manufactures the identified component 122, may further include, in response to a determination that the supplier associated with the user 104 manufactures the identified component 122, determining an estimated time of manufacture of the identified component 122 and an estimated time of delivery of the identified component 122 to the user 104. Analyzing, based on the component detail 130, the inventory of the identified component 122 to determine whether the supplier associated with the user 104 manufactures the identified component 122, may further include comparing the estimated time of manufacture of the identified component 122 and the estimated time of delivery of the identified component 122 to the user 104 to a minimum required time, in response to a determination that the estimated time of manufacture of the identified component 122 and the estimated time of delivery of the identified component 122 to the user 104 is greater than the minimum required time, comparing an estimated time of printing by the three-dimensional printer 110 to the estimated time of manufacture of the identified component 122 and the estimated time of delivery of the identified component 122 to the user 104, and identifying, based on the comparison of the estimated time of printing by the three-dimensional printer 110 to the estimated time of manufacture of the identified component 122 and the estimated time of delivery of the identified component 122 to the user 104, the supplier associated with the user 104 that manufactures the identified component 122 or the three-dimensional printer 110 for receiving the identified component 122.

Figure 7:
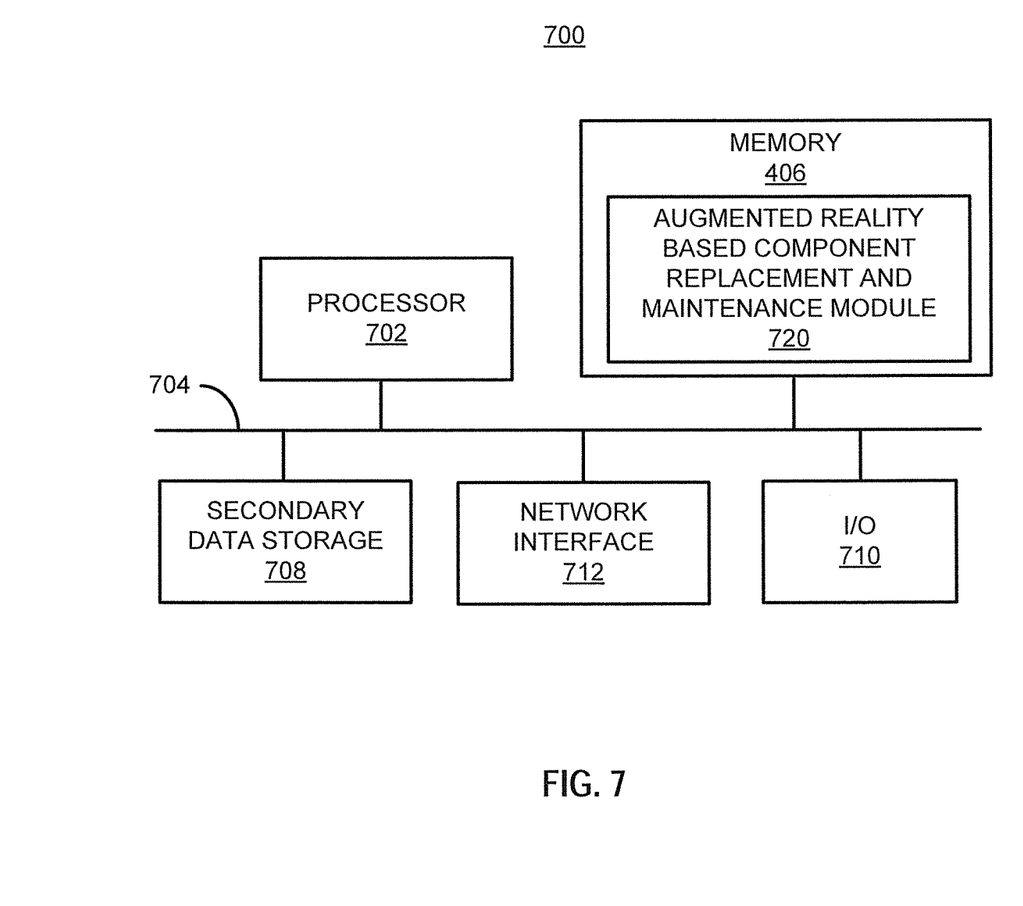
FIG. 7 illustrates a computer system, according to an example of the present disclosure.

FIG. 7 shows a computer system 700 that may be used with the examples described herein. The computer system may represent a generic platform that includes components that may be in a server or another computer system. The computer system 700 may be used as a platform for the system 102. The computer system 700 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 700 may include a processor 702 that may implement or execute machine readable instructions performing some or all of the methods, functions and other processes described herein. Commands and data from the processor 702 may be communicated over a communication bus 704. The computer system may also include a main memory 706, such as a random access memory (RAM), where the machine readable instructions and data for the processor 702 may reside during runtime, and a secondary data storage 708, which may be non-volatile and stores machine readable instructions and data. The memory and data storage are examples of computer readable mediums. The memory 706 may include an AR based component replacement and maintenance module 720 including machine readable instructions residing in the memory 706 during runtime and executed by the processor 702. The AR based component replacement and maintenance module 720 may include the elements of the system 102 shown in FIGS. 1-4.

The computer system 700 may include an I/O device 710, such as a keyboard, a mouse, a display, etc. The computer system may include a network interface 712 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An augmented reality (AR) based component replacement and maintenance system comprising:
   a component identifier, executed by at least one hardware processor, to receive a first wireless signal from a pair of AR glasses worn by a user, wherein the AR glasses include a display viewable by the user and a camera to image a component viewed by the user, wherein the component identifier is to
   analyze the image of the component viewed by the user,
   compare the image of the component viewed by the user to a plurality of images of components stored in a database, wherein the database includes information associated with the plurality of images of the components, and
      based on a match of the image of the component viewed by the user to one of the plurality of images of the components stored in the database, identify the component viewed by the user to determine a component detail by
         determining a confidence of the identification of the component viewed by the user based on a degree of a match of the image of the component viewed by the user to the one of the plurality of images of the components stored in the database, wherein the confidence of the identification of the component increases based on a number of images, including the image of the component viewed by the user, of the component viewed by the user at different angles, and
         in response to a determination that the degree of the match of the image of the component viewed by the user to the one of the plurality of images of the components stored in the database exceeds a specified confidence threshold, designating the component viewed by the user as the identified component;
   a component inventory analyzer, executed by the at least one hardware processor, to analyze an inventory of the identified component to determine
      whether a supplier includes the identified component in stock, and
      in response to a determination that the supplier includes the identified component in stock, an estimated time of delivery of the identified component from the supplier to the user; and
   an AR integrator and controller, executed by the at least one hardware processor, to display, on the AR glasses display, the component detail and order details related to the supplier of the identified component to provide user selection of options in the display to perform functions related to the displayed component detail and the order details.

2. The AR based component replacement and maintenance system according to claim 1, wherein the component detail includes at least one of
   a component identification (ID),
   a component name, or
   a component description.

3. The AR based component replacement and maintenance system according to claim 1, wherein the component inventory analyzer is to analyze the inventory of the identified component to
   determine whether a plurality of suppliers, including the supplier, include the identified component in stock, and
   in response to a determination that the plurality of suppliers, including the supplier, include the identified component in stock, sort selected ones of the plurality of suppliers that include the identified component in stock in order of distance from the user.

4. The AR based component replacement and maintenance system according to claim 1, wherein the component inventory analyzer is to analyze the inventory of the identified component to
   determine whether a plurality of suppliers, including the supplier, include the identified component in stock, and
   in response to a determination that the plurality of suppliers, including the supplier, include the identified component in stock, sort selected ones of the plurality of suppliers that include the identified component in stock in order of estimated times of delivery of the identified component to the user.

5. The AR based component replacement and maintenance system according to claim 1, wherein the component inventory analyzer is to analyze the inventory of the identified component to
   determine whether a plurality of suppliers, including the supplier, include the identified component in stock, and
   in response to a determination that none of the plurality of suppliers, including the supplier, include the identified component in stock, determine a three-dimensional printer that is to be used to print the identified component for the user.

6. The AR based component replacement and maintenance system according to claim 1, wherein the component inventory analyzer is to analyze the inventory of the identified component to
   determine whether a plurality of suppliers, including the supplier, include the identified component in stock,
   in response to a determination that the plurality of suppliers, including the supplier, include the identified component in stock, sort selected ones of the plurality of suppliers that include the identified component in stock in order of estimated times of delivery of the identified component to the user,
   compare the estimated times of delivery for the selected ones of the plurality of suppliers that include the identified component in stock to a minimum required time of delivery, and
   in response to a determination that all of the estimated times of delivery for the selected ones of the plurality of suppliers that include the identified component in stock are greater than the minimum required time of delivery, determine a three-dimensional printer that is to be used to print the identified component for the user.

7. The AR based component replacement and maintenance system according to claim 1, wherein the AR integrator and controller is to
   receive, based on selection of an option in the display, an indication from the user to order the identified component from the supplier.

8. The AR based component replacement and maintenance system according to claim 1, wherein the AR integrator and controller is to
   generate the display including order details related to the supplier of the identified component by generating at least one of
      a map of a location of the supplier of the identified component, or
      a map of a location of a three-dimensional printer that is to be used to print the identified component.

9. The AR based component replacement and maintenance system according to claim 1, wherein the AR integrator and controller is to determine whether the user is an authorized user to order the identified component from the supplier, and in response to a determination that the user is the authorized user to order the identified component from the supplier, authenticate the user to perform the functions related to ordering of the identified component from the supplier.

10. The AR based component replacement and maintenance system according to claim 1, wherein the component inventory analyzer is to analyze the inventory of the identified component to in response to a determination that the supplier does not include the identified component in stock, determine a three-dimensional printer that is to be used to print the identified component for the user.

11. The AR based component replacement and maintenance system according to claim 1, wherein the component inventory analyzer is to analyze the inventory of the identified component to in response to a determination that the supplier does not include the identified component in stock, determine an estimated time of manufacture of the identified component by the supplier, compare the estimated time of manufacture and the estimated time of delivery for the identified component to a minimum required time, and in response to a determination that the estimated time of manufacture and the estimated time of delivery for the identified component is greater than the minimum required time, determine a three-dimensional printer that is to be used to print the identified component for the user.

12. A method for augmented reality (AR) based component replacement and maintenance, the method comprising:

receiving a first wireless signal from an AR device used by a user, wherein the AR device includes a display viewable by the user and a camera to image a component viewed by the user;

analyzing, by a hardware processor, the image of the component viewed by the user;

comparing the image of the component viewed by the user to a plurality of images of components stored in a database, wherein the database includes information associated with the plurality of images of the components;

based on a match of the image of the component viewed by the user to one of the plurality of images of the components stored in the database, identifying the component viewed by the user to determine a component detail;

analyzing, based on the component detail, an inventory of the identified component to determine whether a supplier includes the identified component in stock, in response to a determination that the supplier does not include the identified component in stock, determine an estimated time of delivery of the identified component from the supplier to the user and an estimated time of manufacture of the identified component by the supplier, compare the estimated time of manufacture and the estimated time of delivery for the identified component to a minimum required time, and in response to a determination that the estimated time of manufacture and the estimated time of delivery for the identified component are each greater than the minimum required time, determine a three-dimensional printer that is to be used to print the identified component for the user; and displaying, on the AR device display, the component detail and order details related to the identified component to provide user selection of options in the display to perform functions related to the displayed component detail and the order details.

13. A non-transitory computer readable medium having stored thereon machine readable instructions for augmented reality (AR) based component replacement and maintenance, the machine readable instructions when executed cause a computer system to:

receive a first wireless signal from an AR device used by a user, wherein the AR device includes a display viewable by the user and a camera to image a component viewed by the user;

analyze the image of the component viewed by the user;

compare the image of the component viewed by the user to a plurality of images of components stored in a database, wherein the database includes information associated with the plurality of images of the components;

based on a match of the image of the component viewed by the user to one of the plurality of images of the components stored in the database, identify the component viewed by the user to determine a component detail;

analyze, based on the component detail, an inventory of the identified component to determine whether a supplier associated with the user manufactures the identified component, in response to a determination that the supplier associated with the user manufactures the identified component, determine an estimated time of manufacture of the identified component and an estimated time of delivery of the identified component to the user, in response to a determination that the supplier associated with the user does not manufacture the identified component, determine a three-dimensional printer that is to be used to print the identified component for the user, compare the estimated time of manufacture of the identified component and the estimated time of delivery of the identified component to the user to a minimum required time, in response to a determination that the estimated time of manufacture of the identified component and the estimated time of delivery of the identified component to the user is greater than the minimum required time, compare an estimated time of printing by the three-dimensional printer to the estimated time of manufacture of the identified component and the estimated time of delivery of the identified component to the user, and identify, based on the comparison of the estimated time of printing by the three-dimensional printer to the estimated time of manufacture of the identified component and the estimated time of delivery of the identified component to the user, the supplier associated with the user that manufactures the identified component or the three-dimensional printer for receiving the identified component; and display, on the AR device display, the component detail and order details related to the supplier of the identified component to provide user selection of options in the display to perform functions related to the displayed component detail and the order details.

14. The non-transitory computer readable medium according to claim 13, wherein the AR device includes a pair of AR glasses.

15. The non-transitory computer readable medium according to claim 13, further comprising machine readable instructions to
receive, based on selection of an option in the display, an indication from the user to order the identified component.

16. The non-transitory computer readable medium according to claim 13, wherein the machine readable instructions to analyze, based on the component detail, the inventory of the identified component to determine whether the supplier associated with the user manufactures the identified component, further comprise machine readable instructions to:
determine whether a plurality of suppliers, including the supplier, include the identified component in stock, and
in response to a determination that the plurality of suppliers, including the supplier, include the identified component in stock, sort selected ones of the plurality of suppliers that include the identified component in stock in order of estimated times of delivery of the identified component to the user.

17. The method according to claim 12, wherein the AR device includes a pair of AR glasses.

18. The method according to claim 12, wherein the component detail includes at least one of
a component identification (ID),
a component name, or
a component description.

19. The method according to claim 13, further comprising:
receiving, based on selection of an option in the display, an indication from the user to order the identified component.

20. The non-transitory computer readable medium according to claim 13, wherein the component detail includes at least one of
a component identification (ID),
a component name, or
a component description.

* * * * *

UNITED STATES PATENT AND TRADEMARK OFFICE
CERTIFICATE OF CORRECTION

PATENT NO. : 10,198,620 B2
APPLICATION NO. : 14/792081
DATED : February 5, 2019
INVENTOR(S) : Ping Guo et al.

Page 1 of 1

It is certified that error appears in the above-identified patent and that said Letters Patent is hereby corrected as shown below:

In the Claims

In Column 18, Line 11, Claim 19, "claim 13" should read "claim 12".

Signed and Sealed this
Ninth Day of April, 2019

Andrei Iancu
*Director of the United States Patent and Trademark Office*